United States Patent [19]

Sadatoshi et al.

[11] Patent Number: 5,852,100
[45] Date of Patent: Dec. 22, 1998

[54] THERMOPLASTIC RESIN COMPOSITION

[75] Inventors: Hajime Sadatoshi, Ichihara; Haruyuki Suzuki, Sodegaura; Yuichi Miyake, Nagoya; Takao Nomura, Toyota; Takeyoshi Nishio, Okazaki, all of Japan

[73] Assignees: Sumitomo Chemical Company, Limited, Osaka; Toyota Jidosha Kabushiki Kaisha, Toyota, both of Japan

[21] Appl. No.: 636,220

[22] Filed: Apr. 23, 1996

[30] Foreign Application Priority Data

| Apr. 28, 1995 | [JP] | Japan | 7-106762 |
| Apr. 28, 1995 | [JP] | Japan | 7-106763 |
| Apr. 28, 1995 | [JP] | Japan | 7-106764 |
| Apr. 28, 1995 | [JP] | Japan | 7-106765 |
| Apr. 28, 1995 | [JP] | Japan | 7-106766 |

[51] Int. Cl.$^6$ ................................................ C08L 53/00
[52] U.S. Cl. .......................... 524/505; 525/88; 525/89; 525/185; 525/191; 525/240
[58] Field of Search ..................... 524/505; 525/88, 525/89, 185, 191, 240

[56] References Cited

U.S. PATENT DOCUMENTS

| Re. 30,405 | 9/1980 | Fischer | 525/240 |
| 4,140,732 | 2/1979 | Schnetger et al. | 260/876 B |
| 5,219,913 | 6/1993 | Tomomatsu et al. | 524/451 |
| 5,338,801 | 8/1994 | Eppert, Jr. | 525/232 |
| 5,412,020 | 5/1995 | Yamamoto et al. | 524/505 |
| 5,563,194 | 10/1996 | Watanabe et al. | 524/117 |
| 5,621,046 | 4/1997 | Iwanami et al. | 525/240 |

FOREIGN PATENT DOCUMENTS

| 0437096 | 7/1991 | European Pat. Off. |
| 56-15740 | 4/1981 | Japan . |
| 56-15743 | 4/1981 | Japan . |

OTHER PUBLICATIONS

*Seikei–Kakou*, vol. 6, No. 10 (1993), 669–675 w/partial English translation.
*Polymer Preprints,* Japan vol. 41, No. 9 (1992), 3888–3890 w/partial English translation.
*Polymer Preprints,* Japan vol. 42, No. 9 (1993), 3926–3928 w/partial English translation.

*Primary Examiner*—Edward J. Cain
*Attorney, Agent, or Firm*—Sughrue, Mion, Zinn, Macpeak & Seas, PLLC

[57] ABSTRACT

A thermoplastic resin composition with improved low-temperature impact strength and rigidity against heat, comprising (I) 10–40% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent, (II) 20–85% by weight of a propylene homopolymer and/or an ethylene-propylene block copolymer (an isotactic pentad fraction of a propylene homopolymer portion being 0.98 or above and a melt index of the propylene homopolymer portion being 30–150 g/10 min), and (III) 5–40% by weight of an inorganic filler.

23 Claims, No Drawings

THERMOPLASTIC RESIN COMPOSITION

BACKGROUND OF THE INVENTION

The present invention relates to thermoplastic resin compositions. More particularly it relates to thermoplastic resin compositions comprising polypropylene, olefin-based copolymer rubber and inorganic filler, materials for interior and exterior trim for automobiles comprising said compositions, and moldings thereof for automobile trim. These compositions and materials are excellent in mechanical properties, inter alia bending modulus of elasticity, rigidity against heat and impact resistance, and are advantageously applied to molding of the automobile interior and exterior trim and parts which are required to be heat resistant.

Recently ethylene-propylene block copolymers are popularly used as molding material for automobile parts. The ethylene-propylene block copolymers have essential properties such as bending modulus of elasticity, heat deformation properties and impact strength in balance, but also have disadvantages such as poor low-temperature impact strength for application to automobile bumper. For improving low-temperature impact strength, it has been proposed to blend ethylene-propylene copolymer rubber in the propylene-ethylene block copolymers (JP-A-53-22552, JP-A-53-40045, etc.). However, blending of ethylene-propylene copolymer rubber tends to deteriorate the thermal properties such as bending modulus of elasticity and heat deformation properties of the composition. For overcoming this problem, it has been further proposed to blend inorganic fillers such as calcium carbonate, barium sulfate, mica, crystalline calcium silicate and talc in the copolymer (JP-A-51-136735, JP-A-53-64256, JP-A-53-64257, JP-A-57-55952, JP-A-57-207630, JP-A-58-17139, JP-A-58-111846, JP-A-59-98157, JP-B-55-3374, etc.).

Lately, resin compositions improved in such properties as bending modulus of elasticity and surface hardness by raising the isotactic pentad fraction of a propylene homopolymer portion of polypropylene or ethylene-propylene block copolymer have been proposed (JP-A-5-59251 and JP-A-5-230321).

It has been further disclosed that impact resistance can be improved by blending vulcanized rubber with olefin plastics (JP-B-36-11240, JP-B-38-2126 and JP-B-41-21785). Blending of vulcanized rubber, however, tends to lower fluidity of the composition, resulting in faulty appearance of the product. So, it has been proposed to further blend a mineral oil-based softener or a peroxide-based non-crosslinked rubber-like material for improving fluidity (JP-B-56-15740 and JP-B-56-15743).

Further, JP-A-6-145437 discloses a material which has both impact strength and rigidity in good balance.

Recently, the on-line coating system for automobile exterior parts such as bumper has necessitated further improvement of rigidity against heat. However, low-temperature impact resistance and rigidity against heat are the matters antagonistic to each other, and there have been limitations on the possibility of improving rigidity against heat without impairing low-temperature impact strength with the prior art.

In view of the above, the present invention is designed to provide thermoplastic resin compositions improved in both low-temperature impact resistance and rigidity against heat by use of a specific polypropylene, especially the materials for interior and exterior trim for automobiles comprising said compositions and moldings thereof for such trim.

The present inventors have pursued studies for improving impact resistance and rigidity against heat by dispersing olefin-based copolymer rubbers in polypropylene, and as a result, found that both of low-temperature impact strength and rigidity against heat can be improved by melt mixing with a specific polypropylene and inorganic filler a mixture of polypropylene and an olefin-based copolymer rubber which mixture has been dynamically heat treated in the presence of an organic peroxide and a crosslinking agent. The present invention is based on this discovery.

SUMMARY OF THE INVENTION

The present invention is designed to provide thermoplastic resin compositions comprising:

(I) 10–40% by weight of a mixture of (a) 10–50% by weight of a propylene homopolymer and/or an ethylene-propylene block copolymer (an isotactic pentad fraction of a propylene homopolymer portion being 0.98 or more) and (b) 50–90% by weight of an olefin-based copolymer rubber, said mixture having been dynamically heat treated in the presence of an organic peroxide and a crosslinking agent;

(II) 20–85% by weight of a propylene homopolymer and/or an ethylene-propylene block copolymer (an isotactic pentad fraction of a propylene homopolymer portion being 0.98 or above and a melt index (JIS-K-6758, 230° C.) of the propylene homopolymer portion being 30–150 g/10 min); and (III) 5–40% by weight of an inorganic filler.

The present invention also provides materials for automobile exterior trim which fall in the concept of said thermoplastic resin compositions and comprise:

(I) 25–35% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;

(II) 43–70% by weight of a propylene homopolymer and/or an ethylene-propylene block copolymer (a melt index (JIS-K-6758, 230° C.) of a propylene homopolymer portion being 30–150 g/10 min, and an isotactic pentad fraction of the propylene homopolymer portion being 0.98 or above); and (III) 5–22% by weight of an inorganic filler.

The present invention further provides materials for automobile exterior trim embodying those of said thermoplastic resin compositions which have particularly high heat resistance, said materials comprising:

(I) 16–22% by weight of a mixture of (a) 20–40% by weight of a propylene homopolymer and/or an ethylene-propylene block copolymer (an isotactic pentad fraction of a propylene homopolymer portion being 0.98 or above) and (b) 60–80% by weight of an olefin-based copolymer rubber, said mixture having been dynamically heat treated in the presence of an organic peroxide and a crosslinking agent;

(II) 56–66% by weight of a propylene homopolymer and/or an ethylene-propylene block copolymer (a melt index (JIS-K-6758, 230° C.) of a propylene homopolymer portion being 30–150 g/10 min, and an isotactic pentad fraction of the propylene homopolymer portion being 0.98 or above); and (III) 18–22% by weight of an inorganic filler.

The present invention also provides materials for automobile interior trim among said thermoplastic resin compositions, said materials comprising:

(I) 10–15% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;

(II) 71–84% by weight of a propylene homopolymer and/or an ethylene-propylene block copolymer (an isotactic pentad fraction of a propylene homopolymer portion being 0.98 or above and a melt index (JIS-K-6758, 230° C.) of the propylene homopolymer portion being 30–150 g/10 min); and (III) 6–14% by weight of an inorganic filler.

The present invention further provides instrumental panels for automobiles molded from said thermoplastic resin compositions, said instrumental panels comprising:

(I) 16–22% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;

(II) 52–66% by weight of a propylene homopolymer and/or an ethylene-propylene block copolymer (an isotactic pentad fraction of a propylene homopolymer portion being 0.98 or above and a melt index (JIS-K-6758, 230° C.) of the propylene homopolymer portion being 30–150 g/10 min); and (III) 18–26% by weight of an inorganic filler.

DETAILED DESCRIPTION OF THE INVENTION

In the present invention, "propylene homopolymer" refers to crystalline homopolymer of propylene produced by homopolymerization of propylene using a Zieglar-Natta catalyst, and "ethylene-propylene block copolymer" refers to crystallizable polymer produced by a process comprising homopolymerization of propylene using said type of catalyst to produce a propylene homopolymer as the first step and random copolymerization of ethylene and propylene as the second step.

In the present invention, the propylene homopolymer and the ethylene-propylene block copolymer (a) may be used either singly or in admixture.

An isotactic pentad fraction of a propylene homopolymer portion should be 0.98 or above. If this fraction is less than 0.98, it is hardly possible to obtain rigidity and heat resistance required for attaining the object of the present invention.

The "propylene homopolymer portion" refers to both of the propylene homopolymer and a propylene homopolymer portion of the ethylene-propylene block copolymer.

An ethylene content of an ethylene-propylene random copolymer portion in the ethylene-propylene block copolymer is preferably in the range of from 20 to 70% by weight, more preferably from 25 to 60% by weight.

A melt index of said homopolymer and/or block copolymer (a) preferably falls in the range of from 11 to 30 g/10 min, more preferably from 12 to 20 g/10 min. When the melt index is below 11 g/10 min, the composition tends to be poor in fluidity, and when it exceeds 30 g/10 min, mechanical properties of the composition tend to deteriorate.

The "isotactic pentad fraction" referred to in the present invention means a fraction of isotactic chain of pentad unit in the crystalline polypropylene molecular chain, in other words a fraction of a propylene monomer unit which is at the center of the chain in which five propylene monomer units are metho-bonded successively, as it was measured by a method using 13C-NMR disclosed by A. Zambelli et al in Macromolecules, 6, 925 (1973). Assignment of the NMR absorption peaks was made according to the method shown in Macromolecules, 8, 687 (1975).

More specifically, the isotactic pentad fraction was measured in terms of areal fraction of a mmmm peak in the whole absorption peaks in the methyl-carbon region on the 13C-NMR spectrum. When the isotactic pentad fraction of PP/MWD/2 of an NPL standard substance CRM No. M19–14 polypropylene available from the National Physical Laboratory of Britain was measured by the above method, it was 0.944.

The weight ratio X of the ethylene-propylene random copolymer portion to the whole block copolymer can be determined from the following equation by measuring the quantity of heat of crystal fusion of the propylene homopolymer portion and that of the whole block copolymer.

$$X = 1 - (\Delta Hf)_T / (\Delta Hf)_P$$

wherein $(\Delta Hf)_T$ is the quantity of heat of fusion (cal/g) of the whole block copolymer, and $(\Delta Hf)_P$ is the quantity of heat of fusion (cal/g) of the propylene homopolymer portion.

The ethylene content in the copolymer was decided by the calibration method using absorbance of the characteristic absorptions of methyl group and methylene group appearing on the IR absorption spectrum measured by making a pressed sheet. The ethylene content of the ethylene-propylene random copolymer portion can be calculated from the following equation by measuring the ethylene content of the whole block copolymer.

$$(C_2')_{EP} = (C_2')_T / X$$

wherein $(C_2')_T$ is ethylene content (wt %) of the whole block copolymer, and $(C_2')_{EP}$ is ethylene content (wt %) of the ethylene-propylene random copolymer portion.

The olefin-based copolymer rubber (b) used in the present invention is a copolymer of ethylene and an α-olefin, or a terpolymer of ethylene, an α-olefin and a nonconjugated diene. The α-olefins usable for said copolymer or terpolymer include propylene, butene-1, pentene-1, hexene-1, heptene-1, octene-1 and the like. Of these α-olefins, propylene and butene-1 are preferred.

The nonconjugated dienes usable here include chain nonconjugated dienes such as 1,4-hexadiene and 1,6-octadiene, cyclic nonconjugated dienes such as 1,4-cyclohexadiene, dicyclopentadiene, 5-vinylnorbornene and 5-ethylidene-5-norbornene, and trienes such as 2,3-diisopropylidene-5-norbornene and 2-ethylidene-3-isopropylidene-5-norbornene. Of these nonconjugated dienes, 1,4-hexadiene, dicyclopentadiene and 5-ethylidene-2-norbornene are preferred.

In the present invention, it is possible to use two or more types of olefin-based copolymer rubber (b) in admixture.

The olefin-based copolymer rubber (b) used in this invention preferably has a Mooney viscosity at 100° C. ($ML_{1+4}$ 100° C.) of 10 to 100, more preferably 20 to 80. When the Mooney viscosity at 100° C. of (b) is less than 10, mechanical properties of the composition tend to deteriorate, and when the Mooney viscosity exceeds 100, fluidity of the composition tends to lower to cause faulty appearance of the injection molded product.

In the olefin-based copolymer rubber (b), the ethylene content is preferably 90 to 40% by weight, the α-olefin content 10 to 60% by weight and the nonconjugated diene content 0 to 12% by weight. When the ethylene content is greater than 90% by weight, the copolymer rubber becomes more crystalline because of the presence of an increased amount of ethylene, resulting in a tendency more reduced low-temperature impact resistance. When the ethylene content is less than 40% by weight, mechanical properties of the composition tend to be deteriorated and appearance of the molded product tends to be impaired because of more advancement of decomposition reaction by the organic peroxide. The more preferred range of ethylene content is 80 to 45% by weight. When the nonconjugated diene content exceeds 12% by weight, it tends to become difficult to control the crosslinking reaction.

In the present invention, the ratio of the olefin-based copolymer rubber (b) to 100% by weight of the mixture of (a) a propylene homopolymer and/or an ethylene-propylene block copolymer and (b) an olefin-based copolymer rubber is 50 to 90% by weight, preferably 60 to 80% by weight. When this ratio is less than 50% by weight, the crosslinking reaction by the organic peroxide fails to proceed in a desired way, providing no improvement of mechanical properties. When said ratio exceeds 90% by weight, the composition tends to show thermoplastic nature.

In the present invention, it is desirable to select said ratio from a proper range according to the purpose of use of the composition. The above-defined range is recommended when the composition is used for the ordinary automobile trim or parts, but the ratio of (b) in the mixture of (a) and (b) is preferably 60 to 80% by weight, more preferably 65 to 75% by weight, when the composition is used for the exterior trim which is required to be heat resistant.

The organic peroxide used in the present invention is not specified but may be properly selected according to the melt mixing conditions. There can be used, for example,2,5-dimethyl-2,5-di(t-butylperoxy)-hexane, 2,5-dimethyl-2,5-di(t-butylperoxy)hexine-3, 1,3-bis(t-butylperoxyisopropyl)benzene, 1,1-di(t-butyl-peroxy)-3,5,5-trimethylcyclohexane, 2,5-dimethyl-2,5-di(peroxybenzoyl)hexine-3, and dicumyl peroxide.

The ratio of the organic peroxide can be selected from the range of 0.02 to 1.0% by weight per 100% by weight of the mixture of (a) and (b). When this ratio is less than 0.02% by weight, the effect of the crosslinking reaction tends to be unsufficient, and when the ratio exceeds 1.0% by weight, it tends to become difficult to control the crosslinking reaction.

As the crosslinking agent, bismaleimide compounds such as N,N'-m-phenylenebismaleimide and toluylenemaleimide, and polyfunctional compounds such as p-quinonedioxium, nitrobenzene, diphenylguanidine, trimethylolpropane and ethylene glycol dimethacrylate can be used. N,N'-m-phenylenebismaleimide is commercially available under the trade names of Sumifine BM (Sumitomo Chemical Co., Ltd.), HVA-2 (Du Pont de Nemours & Company), etc.

The ratio of the crosslinking agent can be selected from the range of 0.01 to 5.0% by weight per 100% by weight of the mixture of (a) and (b). When its ratio is less than 0.01% by weight, the agent tends not to produce the desired effect on crosslinking, and when its ratio exceeds 5.0% by weight, moldability of the composition tends to deteriorate. The more preferred range of the ratio of the crosslinking agent is 0.05 to 4.0% by weight.

The heat treatment product (which may be called dynamic heat treatment product) in the present invention can be obtained by dynamically heat treating a propylene homopolymer and/or an ethylene-propylene block copolymer (a) and an olefin-based copolymer rubber (b) in the presence of an organic peroxide and a crosslinking agent such as mentioned above.

A method of dynamic heat treatment in the present invention includes melt mixing said substances at a temperature in the range from 160° to 280° C. by using an appropriate known mixing means such as mixing rolls, Banbury mixer, double-screw kneader/extruder, kneader, continuous mixer, etc. In this case, mixing is preferably carried out in an inert gas such as nitrogen or carbon dioxide.

In the present invention, it is desirable not to use a mineral oil-based softener which is commonly used in the thermoplastic elastomer compositions for the improvement of fluidity and product appearance, because incorporation of a mineral oil-based softener causes a reduction of rigidity and heat resistance of the composition to an extent that makes it impossible to attain the object of the present invention.

The "propylene homopolymer and/or ethylene-propylene block copolymer (II)" which is mixed with said heat treated mixture (I) in the present invention refer to homopolymer of propylene and/or copolymer obtained by homopolymerizing propylene and then copolymerizing ethylene and propylene. Such homopolymer and block copolymer may be used either singly or in admixture.

An ethylene content of the ethylene-propylene copolymer portion in the ethylene-propylene block copolymer is preferably 20 to 70% by weight, more preferably 25 to 60% by weight.

An isotactic pentad fraction of a propylene homopolymer portion should be 0.98 or more. When the fraction is less than 0.98, it is difficult to obtain enough rigidity and heat resistance to satisfy the purpose of the present invention.

A melt index of the propylene homopolymer portion should be in the range from 30 to 150 g/10 min. When it is less than 30 g/10 min, the composition proves poor in fluidity, and when the melt index exceeds 150 g/10 min, mechanical properties of the composition deteriorate.

The propylene homopolymer portion of the ethylene-propylene block copolymer can be obtained by taking out the homopolymer from a polymerization reactor upon completion of homopolymerization of propylene in the course of preparation of the block copolymer.

In the present invention, the above-described melt mixing means and method can be employed for mixing of the heat treated mixture (I) and the propylene homopolymer and/or ethylene-propylene block copolymer (II). In the present invention, said mixing may be carried out in two stages or may be performed in a single stage using a multi-feed type double-screw mixer.

The inorganic filler (III) used in the present invention is not specified as far as it is capable of improving rigidity and heat resistance. For instance, calcium carbonate, barium sulfate, mica, crystalline calcium silicate, talc and glass fiber can be used. Talc and glass fiber are preferred.

In case of using talc, it is preferably of the type having an average particle size of 1 to 5 μm. When the average particle size is less than 1 μm, there tend to arise the problems such as reagglomeration and improper dispersion of the talc particles. When the average particle size is greater than 5 μm, the effect of improving impact resistance and rigidity tends not to be sufficient. As for glass fiber, it is recommended to use chopped glass fiber of 4 to 13 μm in size which has been surface treated with a silane coupling agent.

The contents of (I), (II) and (III) in the thermoplastic resin composition of the present invention are 10–40% by weight, 20–85% by weight and 5–40% by weight, respectively, preferably 10–30% by weight, 50–80% by weight and 10–25% by weight, respectively.

When the content of the heat treated mixture (I) is less than 10% by weight, low-temperature impact strength of the composition deteriorates, and when its content exceeds 40% by weight, fluidity of the composition is reduced to cause faulty appearance of the molded product. Also, when the content of the inorganic filler (III) is less than 5% by weight, its effect of improving rigidity and heat resistance is unsatisfactory, and when its content exceeds 40% by weight, fluidity of the composition lowers.

In the present invention, it is desirable to select the appropriate contents from the above-defined ranges in accordance with the purpose of use of the composition. For instance, in case the composition is used for exterior trim for automobiles, the contents of (I), (II) and (III) in the final composition should be 25–35% by weight, 43–70% by weight and 5–22% by weight, respectively, preferably 25–30% by weight, 50–65% by weight and 10–20% by weight, respectively. In the case of exterior trim which is required to be heat resistant, the contents of (I), (II) and (III) in the final composition should be 16–22% by weight, 56–66% by weight and 18–22% by weight, respectively, preferably 17–21% by weight, 59–63% by weight and 19–21% by weight, respectively.

In the case of automobile interior trim other than instrumental panel, such as pillar, door trim, etc., the contents of (I), (II) and (III) in the final composition should be 10–15% by weight, 71–84% by weight and 6–14% by weight, respectively, preferably 11–14% by weight, 74–81% by weight and 8–12% by weight, respectively.

In the case of instrumental panel, the contents of (I), (II) and (III) in the final composition should be 16–22% by weight, 52–66% by weight and 18–26% by weight, respectively, preferably 17–21% by weight, 55–64% by weight and 19–22% by weight, respectively.

For mixing an inorganic filler (III) in the present invention, the mixing means mentioned above can be used in the similar way. Various mixing methods are also applicable; for instance, a mixture of (I) and (II) is first prepared, and then (III) is mixed, or (III) is mixed simultaneously when (II) is mixed in the heat treated mixture (I) of (a) and (b). Preferably, (II) and (III) are simultaneously added and mixed in the heat treated mixture (I) of (a) and (b).

The thermoplastic resin composition according to the present invention may contain other polymer(s) and additive (s) such as heat stabilizer, nucleating agent, ultraviolet absorber, lubricant, antistatic agent, flame retardant, pigment, dye, etc., within limits not prejudicial to the object of the present invention.

EXAMPLES

The present invention is further illustrated by the following examples. It is to be understood, however, that these examples are merely intended to be illustrative and not to be construed as limiting the scope of the invention. The determination methods of the respective property values given in the following Examples and Comparative Examples and the mixing means used therein are described below.

(1) Melt index (MI)

Determined according to the method of JIS-K-6758 at 230° C. under a load of 2.16 kg.

(2) Bending test

Conducted according to the method of JIS-K-7203. Using the injection molded test pieces (each being 6.4 mm thick), the flexural modulus was measured under the following conditions: span length of 100 mm, loading rate of 2.0 mm/min, measuring temperature of 23° C.

(3) Izod impact strength

Determined according to the method of JIS-K-7110. Notched impact strength was measured using the injection molded test pieces (each being 6.4 mm thick) which were notched after molding. Measurement was made at 23° C. unless otherwise noted. In case other temperatures were used, measurement was made after conditioning the test pieces in a thermostat at a prescribed temperature for 2 hours.

(4) Rockwell hardness

Determined according to the method of JIS-K-7202 using the injection molded test pieces (each being a laminate of two sheets each having a thickness of 3.2 mm) and a steel ball R. The measurements were represented by the values on R scale.

(5) Heat deformation temperature (HDT)

Determined according to the method of JIS-K-7207. Using the injection molded test pieces (each being a total thickness of 6.4 mm), the temperature at which the test piece produced a deflection of 0.254 mm when heated at a rate of 2° C. mm/min under a fiber stress of 4.6 kgf/cm$^2$ was measured.

(6) Banbury mixer

MIXTRON BB-16 MIXER (Kobe Steel Co., Ltd.) with 2-wing rotor and a chamber capacity of 17.7 liters was used.

(7) Double-screw kneader/extruder

TEX-44SS-30W-2V (different-direction rotor type) (JAPAN STEEL WORKS, LTD.) with 44 mm×30 L/D screws was used.

The materials used in the Examples and Comparative Examples described below are shown in Tables 1 and 2 by the abbreviations which represent the following:

PP: propylene homopolymer

BC: ethylene-propylene block copolymer

EPR: ethylene-propylene copolymer rubber

EBR: ethylene-butene-1 copolymer rubber

EPDM: ethylene-propylene-nonconjugated diene terpolymer rubber

PO: organic peroxide of 2,5-dimethyl-2,5-di(t-butylperoxy)hexane

BM: crosslinking agent of N,N'-m-phenylene-bismaleimide

Example 1

A propylene homopolymer (PP-1) (30% by weight) and an ethylene-propylene-nonconjugated diene terpolymer (EPDM-1) (70% by weight) were mixed in the presence of an organic peroxide (PO) (0.1% by weight) and a crosslinking agent (BM) (0.5% by weight) based on 100% by weight of a total weight of PP-1 and EPDM-1 by a Banbury mixer under heat insulation for 10 minutes, and the mixture was passed between rolls and cut into pellets (hereinafter referred to MB or MB pellets) by a sheet cutter (first step).

Then PP-3 (24% by weight), an ethylene-propylene block copolymer (BC-2) (36% by weight), MB prepared in the first step (20% by weight) and talc (20% by weight) were uniformly mixed with specific stabilizers, and the mixture was granulated at 200° C. by a double-screw kneader/extruder and injection molded into a test piece. The test piece was evaluated regarding the items mentioned above. The MB and compound compositions are shown in Table 2 and the results of evaluation are shown in Table 4.

Examples 2–4

MB pellets were produced by following the same procedure as Example 1 except that the amount of BM was changed to 1.0% by weight (Example 2) and 2.0% by weight (Example 3) (first step). The same MB pellets as in Example 2 were used in Example 4.

Then the compounds of the compositions shown in Table 2 including said MB pellets were granulated in the same manner as in Example 1 (second step) and injection molded into the test pieces. These test pieces were evaluated as in Example 1 to obtain the results shown in Table 4.

Examples 5 and 6

MB pellets were produced according to the same procedure as Example 1 except that the amount of BM was changed to 4.0% by weight in Example 6 (first step). The same MB pellets as in Example 3 were used in Example 5.

Then the compounds of the compositions shown in Table 2 including said MB pellets were granulated in the same manner as in Example 1 (second step) and injection molded into the test pieces. These test pieces were evaluated as in Example 1 to obtain the results shown in Table 4.

Examples 7–11

MB pellets were produced according to the procedure of Example 1 and the compounds of the compositions shown in Table 2 including said MB pellets were granulated in the same manner as in Example 1 (second step) and injection molded into test pieces. The evaluation results of these test pieces are shown in Table 4.

Comparative Examples 1 and 2

PP-2 (42% and 32% by weight), BC-4 (22% and 28% by weight), EPDM-2 (16% and 20% by weight) and talc (20% by weight) were mixed uniformly with the specific stabilizers, then granulated by a double-screw kneader/extruder at 200° C. and injection molded into test pieces. The evaluation results of these test pieces are shown in Table 5.

Comparative Examples 3 and 4

BC-4 (58% by weight) and EPDM-3 (42% by weight) were mixed by a Banbury mixer under heat insulation for 10 minutes, and the mixture was passed between rolls and cut into pellets (MB) by a sheet cutter (first step).

Then PP-2 (42% and 32% by weight), MB (38% and 48% by weight) obtained in the first step and talc (20% by weight) were mixed and granulated in the same manner as in Comparative Example 1 (second step) and injection molded into test pieces. The evaluation results of these test pieces are shown in Table 5.

Comparative Examples 5 and 6

PP-1 (30% by weight), EPDM-3 (70% by weight) and EPDM-2 (70% by weight) were mixed by a Banbury mixer under heat insulation for 10 minutes, then passed between rolls and cut into pellets (MB) by a sheet cutter (first step).

Then PP-2 (32% by weight), BC-4 (28% by weight), MB (20% by weight) produced in the first step and talc (20% by weight) were mixed and granulated in the same manner as in Comparative Example 1 (second step) and injection molded into test pieces. The evaluation results of these test pieces are shown in Table 5.

Comparative Examples 7 and 8

PP-3 (20% and 30% by weight), BC-1 (36% by weight), EPR (12% and 7% by weight), EBR (12% and 7% by weight) and talc (20% by weight) were mixed and granulated in the same manner as in Comparative Example 1, injection molded into test pieces and evaluated. The results are shown in Table 5.

Comparative Examples 9 and 10

PP-2 (39% and 37% by weight), BC-2 or BC-3 (39% or 41% by weight each), EPR (6% by weight), EBR (6% by weight) and talc (10% by weight) were mixed and granulated in the same manner as in Comparative Example 1, injection molded into test pieces and evaluated. The results are shown in Table 5.

Example 12

A propylene homopolymer (PP-1) (30% by weight) and an ethylene-propylene-nonconjugated diene terpolymer rubber (EPDM-1) (70% by weight) were mixed in the presence of an organic peroxide (PO) (0.1% by weight) and a crosslinking agent (BM) (0.5% by weight) based on 100% by weight of a total weight of PP-1 and EPDM-1 by a Banbury mixer under heat insulation for 10 minutes, and the mixture was passed between rolls and cut into pellets (MB) by a sheet cutter (first step).

Then PP-3 (6% by weight), an ethylene-propylene block copolymer (BC-8) (45% by weight), MB produced in the first step (29% by weight) and talc (20% by weight) were mixed uniformly with the specific stabilizers, then granulated by a double-screw kneader/extruder at 200° C. (second step) and injection molded into test pieces for evaluation. The compositions of MB and the uniform mixture (compound) are shown in Table 2 for reference. The evaluation results are shown in Table 4.

Example 13

PP-3 (10% by weight), BC-2 (45% by weight), MB produced in Example 1 (25% by weight) and talc (20% by weight) were mixed, granulated, injection molded into test piece and evaluated according to the procedure of Example 1. The compositions of MB and the compound are shown in Table 2, and the evaluation results are shown in Table 4.

Example 14

The procedure of Example 12 was followed except that the amounts of PP-3 and talc were changed to 16% by weight and 10% by weight, respectively, to obtain test piece for evaluation. The compositions of MB and the compound are shown in Table 2, and the evaluation results are shown in Table 4.

Comparative Example 11

PP-2 (23% by weight), BC-4 (33% by weight), EPDM-2 (24% by weight) and talc (20% by weight) were mixed uniformly with the specific stabilizers, then granulated by a double-screw kneader/extruder at 200° C. and injection molded into test piece. The compound composition is shown in Table 3 and the evaluation results of the test piece are shown in Table 5.

Comparative Example 12

BC-4 (58% by weight) and EPDM-3 (42% by weight) were mixed by a Banbury mixer under heat insulation for 10 minutes, and the mixture was passed between rolls and cut into pellets (MB) by a sheet cutter (first step).

Then PP-2 (23% by weight), MB produced in the first step (57% by weight) and talc (20% by weight) were mixed and granulated in the same manner as in Comparative Example 1 (second step), injection molded into test piece and evaluated. The compositions of MB and the compound used are shown in Table 3 and the evaluation results are shown in Table 5.

Comparative Example 13

PP-2 (16% by weight), BC-5 (40% by weight), EPDM-2 (24% by weight) and talc (20% by weight) were mixed, granulated, injection molded into test piece and evaluated in the same manner as in Comparative Example 1. The compound composition is shown in Table 3 and the evaluation results are shown in Table 5.

Comparative Example 14

The procedure of Comparative Example 1 was followed except that EPDM-2 in Comparative Example 3 was replaced by EBR, respectively, to make a test piece for evaluation. The compound composition is shown in Table 3 and the evaluation results are shown in Table 5.

Comparative Example 15

PP-4 (5% by weight), BC-6 (54% by weight), EPR (11% by weight), EBR (15% by weight), EPDM-2 (4% by weight) and talc (JR-37) (11% by weight) were mixed, granulated, injection molded into test piece and evaluated according to the procedure of Comparative Example 1. The compound composition is shown in Table 3 and the evaluation results are shown in Table 5.

Comparative Examples 16 and 17

Using BC-7 (71% and 67% by weight), EPR (19% and 24% by weight) and talc (JR-34) (10% and 9% by weight), the procedure of Comparative Example 1 was followed for granulation, formation of test piece and evaluation. The compound composition is shown in Table 3 and the evaluation results are shown in Table 5.

Example 15

The procedure of Example 10 was followed except that, in the second step, the amounts of PP-2, BC-2 and MB were changed to 45% by weight, 31% by weight and 14% by weight, respectively, to prepare a test piece and it was evaluated in the manner described above. The composition of the uniform mixture (compound) is shown in Table 2 for reference, and the evaluation results are shown in Table 4.

Comparative Example 18

The procedure of Comparative Example 9 was followed except that EPR was used in an amount of 12% by weight instead of using 6% by weight of EPR and 6% by weight of EBR used in Comparative Example 10. The composition of the uniform mixture (compound) is shown in Table 3 for reference, and the evaluation results are shown in Table 5.

Comparative Example 19

Using 40% by weight of PP-2, 36% by weight of BC-1, 14% by weight of EPR and 10% by weight of talc, the procedure of Comparative Example 9 was followed for preparation of a test piece and its evaluation. The composition of the uniform mixture (compound) is shown in Table 3 for reference, and the evaluation results are shown in Table 5.

Comparative Example 20

Using the same materials as used in Comparative Example 4 except that PP-2 was replaced by PP-4, the procedure of Comparative Example 9 was followed for preparation of a test piece and its evaluation. The composition of the uniform mixture (compound) is shown in Table 3 for reference, and the evaluation results are shown in Table 5.

According to the present invention, there are provided thermoplastic resin compositions comprising a mixture of a propylene homopolymer and/or an ethylene-propylene block copolymer and an olefin-based copolymer rubber, said mixture having been dynamically heat treated in the presence of an organic peroxide and a crosslinking agent, a propylene homopolymer and/or an ethylene-propylene block copolymer, and an inorganic filler; materials for automobile trim comprising said compositions; and moldings thereof for said trim. Such materials have excellent mechanical properties, inter alia flexural modulus, rigidity against heat and impact strength, and find advantageous application to molding of automobile trim.

TABLE 1

| Sample | | MI (230° C.) (g/10 min) | | Isotactic pentad fraction | Ethylene-propylene copolymer portion | |
|---|---|---|---|---|---|---|
| | | Whole | PP portion of BC | | Content 1 (wt %) | Content 2 (wt %) |
| Poly pro- pylene | PP-1 | 13 | — | 0.98 | — | — |
| | PP-2 | 95 | — | 0.98 | — | — |
| | PP-3 | 78 | — | 0.99 | — | — |
| | PP-4 | 120 | — | 0.97 | — | — |
| | BC-1 | 12 | 35 | 0.98 (pp portion) | 16.7 | 36.5 |
| | BC-2 | 12 | 32 | 0.98 (pp portion) | 16.9 | 36.9 |
| | BC-3 | 38 | 120 | 0.98 (pp portion) | 16.3 | 25.7 |
| | BC-4 | 16 | 56 | 0.98 (pp portion) | 18.2 | 30.8 |
| | BC-5 | 27 | 94 | 0.97 (pp portion) | 19.2 | 49.0 |
| | BC-6 | 52 | 120 | 0.97 (pp portion) | 11.0 | 33.0 |
| | BC-7 | 20 | 30 | 0.96 (pp portion) | 15.0 | 40.0 |
| | BC-8 | 30 | 94 | 9.98 (pp portion) | 11.0 | 51.8 |

TABLE 1-continued

| | Sample | $ML_{1+4}$ 100° C. | α-olefin content (wt %) | Nonconjugated diene content (wt %) |
|---|---|---|---|---|
| Rubber | EPR | 52 | 27 ($C_3'$) | — |
| | EBR | 48 | 17 ($C_4'$) | — |
| | EPDM-1 | 43 | 50 ($C_3'$) | 5.3 (EN) |
| | EPDM-2 | 88 | 28 ($C_3'$) | 7.2 (EN) |
| | EPDM-3 | 133 | 40 ($C_3'$) | 4.8 (EN) |

PP: propylene homopolymer
BC: ethylene-propylene block copolymer
EPR: ethylene-propylene copolymer rubber
EBR: ethylene-butene-1 copolymer rubber
EPDM: ethylene-propylene-nonconjugated terpolymer rubber
C3': propylene
C4': butene-1
EN: 5-ethylidene-2-norbornene
content 1: content of ethylene-propylene copolymer portion in BC
content 2: ethylene content of ethylene-propylene copolymer portion in BC

TABLE 2

| Example | MB (pellets) | | | | | | Compound (wt %) | | | | | | | | | | | |
|---|---|---|---|---|---|---|---|---|---|---|---|---|---|---|---|---|---|---|
| | PP-1 | BC-4 | EPDM-1 | EPDM-3 | PO | BM | PP-2 | PP-3 | BC-1 | BC-2 | BC-3 | BC-4 | BC-5 | BC-7 | MB | EPR | EBR | EPDM-2 | Talc |
| 1 | 30 | | | 70 | 0.1 | 0.5 | 24 | 36 | | | | | | | 20 | | | | 20 |
| 2 | 30 | | | 70 | 0.1 | 1.0 | 24 | 36 | | | | | | | 20 | | | | 20 |
| 3 | 30 | | | 70 | 0.1 | 2.0 | 24 | 36 | | | | | | | 20 | | | | 20 |
| 4 | 30 | | | 70 | 0.1 | 1.0 | 15 | 48 | | | | | | | 17 | | | | 20 |
| 5 | 30 | | | 70 | 0.1 | 2.0 | 24 | | | | 37 | | | | 20 | | | | 19 |
| 6 | 30 | | | 70 | 0.1 | 4.0 | 23 | | | | 37 | | | | 20 | | | | 20 |
| 7 | 30 | | | 70 | 0.1 | 2.0 | 20 | | | 45 | | | | | 25 | | | | 10 |
| 8 | 30 | | | 70 | 0.1 | 2.0 | 6 | | | 54 | | | | | 30 | | | | 10 |
| 9 | 30 | | | 70 | 0.1 | 2.0 | 5 | | | | 55 | | | | 30 | | | | 10 |
| 10 | 30 | | | 70 | 0.1 | 2.0 | 39 | | | 39 | | | | | 12 | | | | 10 |
| 11 | 30 | | | 70 | 0.1 | 2.0 | 37 | | | | | 41 | | | 12 | | | | 10 |
| 12 | 30 | | | 70 | 0.1 | 0.5 | | 6 | | 45 | | (BC-8) | | | 29 | | | | 20 |
| 13 | 30 | | | 70 | 0.1 | 0.5 | | 10 | 45 | | | | | | 25 | | | | 20 |
| 14 | 30 | | | 70 | 0.1 | 0.5 | | 16 | | 45 | | (BC-8) | | | 29 | | | | 10 |
| 15 | 30 | | | 70 | 0.1 | 2.0 | 45 | | | | 31 | | | | 14 | | | | 10 |

Talc: JR-39 (mfd. by Japan Talc Co., Ltd.)
PO: 2,5-dimethyl-2,5-di(t-butylperoxy)hexane
BM: N,N'-m-phenylenebismaleimide

TABLE 3

| Comp. Example | MB (pellets) | | | | | | Compound (wt %) | | |
|---|---|---|---|---|---|---|---|---|---|
| | PP-1 | BC-4 | EPDM-1 | EPDM-3 | PO | BM | PP-2 | PP-3 | BC-1 |
| 1 | — | — | — | — | — | — | 42 | — | — |
| 2 | — | — | — | — | — | — | 32 | — | — |
| 3 | — | 58 | — | 42 | — | — | 42 | — | — |
| 4 | — | 58 | — | 42 | — | — | 32 | — | — |
| 5 | 30 | — | — | 70 | — | — | 32 | — | — |
| 6 | 30 | — | 70 | (EPDM-2) | — | — | 32 | — | — |
| 7 | — | — | — | — | — | — | — | 20 | 36 |
| 8 | — | — | — | — | — | — | — | 30 | 36 |
| 9 | — | — | — | — | — | — | 39 | — | |
| 10 | — | — | — | — | — | — | 37 | — | |
| 11 | 58 | (BC-4) | — | 42 | — | — | 23 | — | 33 |
| 12 | — | — | — | — | — | — | 23 | — | — |
| 13 | — | — | — | — | — | — | 16 | — | — |
| 14 | — | — | — | — | — | — | 16 | — | — |
| 15 | — | — | — | — | — | — | 5 | (PP-4) | 54 |
| 16 | — | — | — | — | — | — | — | — | — |
| 17 | — | — | — | — | — | — | — | — | — |
| 18 | — | — | — | — | — | — | 37 | — | — |
| 19 | — | — | — | — | — | — | 40 | — | 36 |
| 20 | — | — | — | — | — | — | 40 | (PP-4) | 36 |

TABLE 3-continued

| Comp. Example | Compound (wt %) | | | | | | | | | |
|---|---|---|---|---|---|---|---|---|---|---|
| | BC-2 | BC-3 | BC-4 | BC-5 | BC-7 | MB | EPR | EBR | EPDM-2 | Talc |
| 1 | — | — | 22 | — | — | — | — | — | 16 | 20 |
| 2 | — | — | 28 | — | — | — | — | — | 20 | 20 |
| 3 | — | — | — | — | — | 38 | — | — | — | 20 |
| 4 | — | — | — | — | — | 48 | — | — | — | 20 |
| 5 | — | — | 28 | — | — | 20 | — | — | — | 20 |
| 6 | — | — | 28 | — | — | 20 | — | — | — | 20 |
| 7 | — | — | — | — | — | — | 12 | 12 | — | 20 |
| 8 | — | — | — | — | — | — | 7 | 7 | — | 20 |
| 9 | 39 | — | — | — | — | — | 6 | 6 | — | 10 |
| 10 | — | 41 | — | — | — | — | 6 | 6 | — | 10 |
| 11 | (BC-4) | — | — | — | — | — | — | — | 24 | 20 |
| 12 | — | — | — | — | — | — | — | — | — | 20 |
| 13 | — | — | — | 40 | — | — | — | — | 24 | 20 |
| 14 | — | — | — | 40 | — | — | — | 24 | — | 20 |
| 15 | (BC-4) | — | — | — | — | 11 | 15 | — | 4 | 10[1] |
| 16 | — | — | — | — | −71 | 19 | — | — | — | 10[1] |
| 17 | — | — | — | — | 67 | — | 24 | — | — | 9[2] |
| 18 | — | 41 | — | — | — | — | 12 | — | — | 10 |
| 19 | — | — | — | — | — | — | 14 | — | — | 10 |
| 20 | — | — | — | — | — | — | 14 | — | — | 10 |

Talc: JR-39 (mfd. by Japan Talc Co., Ltd.)
[1] JR-37
[2] JR-34

TABLE 4

| Unit | MI g/10 mn | Specific gravity | Flexural modulus kg/cm² | Izod Impact | | HDT °C. | Rockwell hardness R scale |
|---|---|---|---|---|---|---|---|
| | | | | 23° C. kg · cm/cm | −30° C. kg · cm/cm | | |
| Example | | | | | | | |
| 1 | 10 | 1.039 | 24100 | 18 | 3.8 | 140 | 79 |
| 2 | 10 | 1.039 | 23600 | 22 | 4.0 | 139 | 77 |
| 3 | 9 | 1.037 | 22800 | 21 | 3.9 | 139 | 77 |
| 4 | 9 | 1.040 | 25100 | 17 | 3.7 | 141 | 81 |
| 5 | 17 | 1.033 | 22900 | 16 | 3.9 | 139 | 76 |
| 6 | 14 | 1.042 | 24800 | 13 | 3.9 | 140 | 78 |
| 7 | 10 | 0.966 | 15100 | 35 | 6.5 | 126 | 70 |
| 8 | 5 | 0.962 | 12700 | 57 | 11 | 116 | 56 |
| 9 | 10 | 0.964 | 12600 | 47 | 10 | 121 | 56 |
| 10 | 20 | 0.970 | 20500 | 7.5 | 2.8 | 137 | 92 |
| 11 | 34 | 0.971 | 20700 | 6.5 | 2.5 | 139 | 91 |
| 12 | 9 | 1.036 | 20100 | 40 | 5.9 | 132 | 56 |
| 13 | 6 | 1.038 | 20400 | 46 | 5.9 | 132 | 63 |
| 14 | 15 | 0.964 | 14800 | 39 | 7.0 | 126 | 65 |
| 15 | 21 | 0.968 | 20900 | 8.2 | 3.1 | 138 | 91 |

TABLE 5

| Unit | MI g/10 mn | Specific gravity | Flexural modulus kg/cm² | Izod Impact | | HDT °C. | Rockwell hardness R scale |
|---|---|---|---|---|---|---|---|
| | | | | 23° C. kg · cm/cm | −30° C. kg · cm/cm | | |
| Comp. Example | | | | | | | |
| 1 | 17 | 1.035 | 23500 | 7.6 | 2.9 | 137 | 78 |
| 2 | 12 | 1.034 | 21700 | 22 | 4.4 | 136 | 68 |
| 3 | 14 | 1.037 | 23800 | 6.9 | 3.3 | 140 | 80 |
| 4 | 9 | 1.033 | 20300 | 18 | 5.1 | 134 | 67 |
| 5 | 10 | 1.039 | 24600 | 9.1 | 2.8 | 137 | 78 |
| 6 | 10 | 1.038 | 24700 | 8.2 | 2.4 | 139 | 82 |
| 7 | 9 | 1.037 | 20200 | 43 | 4.1 | 136 | 61 |
| 8 | | 1.039 | 26800 | 14 | 2.4 | 142 | 86 |
| 9 | 22 | 0.968 | 21100 | 6.6 | 2.1 | 139 | 90 |
| 10 | 34 | 0.967 | 20200 | 5.9 | 2.0 | 137 | 89 |
| 11 | 8 | 1.034 | 18400 | 54 | 7.5 | 129 | 49 |

TABLE 5-continued

| Unit | MI g/10 mn | Specific gravity | Flexural modulus kg/cm$^2$ | Izod Impact 23° C. kg · cm/cm | Izod Impact −30° C. kg · cm/cm | HDT °C. | Rockwell hardness R scale |
|---|---|---|---|---|---|---|---|
| 12 | 5 | 1.028 | 17400 | 42 | 7.2 | 125 | 50 |
| 13 | 8 | 1.024 | 18300 | 43 | 5.6 | 124 | 52 |
| 14 | 10 | 1.037 | 19300 | 46 | 4.2 | 129 | 70 |
| 15 | 20 | 0.970 | 14500 | 48 | 5.3 | 124 | 59 |
| 16 | 11 | 0.959 | 14100 | 27 | 4.7 | 116 | 55 |
| 17 | 9 | 0.950 | 12300 | 47 | 7.3 | 116 | 50 |
| 18 | 35 | 0.965 | 20300 | 6.0 | 2.2 | 138 | 88 |
| 19 | 20 | 0.967 | 20900 | 7.7 | 2.3 | 136 | 87 |
| 20 | 20 | 0.964 | 20200 | 6.7 | 2.1 | 135 | 85 |

What is claimed is:

1. A thermoplastic resin composition comprising:
  (I) 10–40% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;
  (II) 20–85% by weight of a propylene homopolymer and/or an ethylene-propylene block copolymer (an isotactic pentad fraction of a propylene homopolymer portion being 0.98 or above and a melt index TJIS-K-6758, 230° C.) of the propylene homopolymer portion being 30–150 g/10 min); and
  (III) 5–40% by weight of an inorganic filler.

2. An automobile exterior trim material comprising:
  (I) 25–35% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;
  (II) 43–70% by weight of a propylene homopolymer and/or an ethylene-propylene block copolymer (a melt index (JIS-K-6758, 230° C.) of a propylene homopolymer portion being 30–150 g/10 min, and an isotactic pentad fraction of the propylene homopolymer portion being 0.98 or above); and
  (III) 5–22% by weight of an inorganic filler.

3. An automobile exterior trim material with excellent heat resistance comprising:
  (I) 16–22% by weight of a mixture of (a) 20–40% by weight of a propylene homopolymer and/or an ethylene-propylene block copolymer (an isotactic pentad fraction of a propylene homopolymer portion being 0.98 or above) and (b) 60–80% by weight of an olefin-based copolymer rubber, said mixture having been dynamically heat treated in the presence of an organic peroxide and a crosslinking agent;
  (II) 56–66% by weight of a propylene homopolymer and/or an ethylene-propylene block copolymer (a melt index (JIS-K-6758, 230° C.) of a propylene homopolymer portion being 30–150 g/10 min, and an isotactic pentad fraction of the propylene homopolymer portion being 0.98 or above); and
  (III) 18–22% by weight of an inorganic filler.

4. An automobile interior trim material comprising:
  (I) 10–15% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;
  (II) 71–84% by weight of a propylene homopolymer and/or an ethylene-propylene block copolymer (an isotactic pentad fraction of a propylene homopolymer portion being 0.98 or above and a melt index (JIS-K-6758, 230° C.) of the propylene homopolymer portion being 30–150 g/10 min); and
  (III) 6–14% by weight of an inorganic filler.

5. An instrumental panel for automobiles comprising:
  (I) 16–22% by weight of a mixture of (a) 10–50% by weight of a propylene homopolymer and/or an ethylene-propylene block copolymer (an isotactic pentad fraction of a propylene homopolymer portion being 0.98 or above) and (b) 50–90% by weight of an olefin-based copolymer rubber, said mixture having been dynamically heat treated in the presence of an organic peroxide and a crosslinking agent;
  (II) 52–66% by weight of a propylene homopolymer and/or an ethylene-propylene block copolymer (an isotactic pentad fraction of a propylene homopolymer portion being 0.98 or above, and a melt index (JIS-K-6758, 230° C.) of the propylene homopolymer portion being 30–150 g/10 min); and
  (III) 18–26% by weight of an inorganic filler.

6. The thermoplastic resin composition according to claim 1, wherein a melt index (JIS-K-6758, 230° C.) of the propylene homopolymer and/or the ethylene-propylene block copolymer (a) is 11–30 g/10 min.

7. The automobile exterior trim material according to claim 2, wherein a melt index (JIS-K-6758, 230° C.) of the propylene homopolymer and/or the ethylene-propylene block copolymer (a) is 11–30 g/10 min.

8. The automobile exterior trim material according to claim 3, wherein a melt index (JIS-K-6758, 230° C.) of the propylene homopolymer and/or the ethylene-propylene block copolymer (a) is 11–30 g/10 min.

9. The automobile interior trim material according to claim 4, wherein a melt index (JIS-K-6758, 230° C.) of the propylene homopolymer and/or the ethylene-propylene block copolymer (a) is 11–30 g/10 min.

10. The instrumental panel for automobiles according to claim 5, wherein a melt index (JIS-K-6758, 230° C.) of the propylene homopolymer and/or the ethylene-propylene block copolymer (a) is 11–30 g/10 min.

11. The thermoplastic resin composition according to claim 1, wherein the olefin-based copolymer rubber (b) is an ethylene-α-olefin copolymer rubber or ethylene-α-olefin-nonconjugated diene terpolymer rubber having an ethylene content of 90–40% by weight, an α-olefin content of 10–60% by weight, a nonconjugated diene content of 0–12% by weight, and a Mooney viscosity ($ML_{1+4}$ 100° C.) of 10–100.

12. The thermoplastic resin composition according to claim 11, wherein the α-olefin is propylene or butene-1.

13. The automobile exterior trim material according to claim 2, wherein the olefin-based copolymer rubber (b) is an ethylene-α-olefin copolymer rubber or ethylene-α-olefin-nonconjugated diene terpolymer rubber having an ethylene content of 90–40% by weight, an α-olefin content of 10–60% by weight, a nonconjugated diene content of 0–12% by weight, and a Mooney viscosity ($ML_{1+4}$ 100° C.) of 10–100.

14. The automobile exterior trim material according to claim 13, wherein the α-olefin is propylene or butene-1.

15. Moldings for automobile exterior trim using the automobile exterior trim material according to claim 2.

16. The automobile exterior trim material according to claim 3, wherein the olefin-based copolymer rubber (b) is an ethylene-α-olefin copolymer rubber or ethylene-α-olefin-nonconjugated diene terpolymer rubber having an ethylene content of 90–40% by weight, an α-olefin content of 10–60% by weight, a nonconjugated diene content of 0–12% by weight, and a Mooney viscosity ($ML_{1+4}$ 100° C.) of 10–100.

17. The automobile exterior trim material according to claim 16, wherein the α-olefin is propylene or butene-1.

18. Moldings for automobile exterior trim using the automobile exterior trim material according to claim 3.

19. The automobile interior trim material according to claim 4, wherein the olefin-based copolymer rubber (b) is an ethylene-α-olefin copolymer rubber or ethylene-α-olefin-nonconjugated diene terpolymer rubber having an ethylene content of 90–40% by weight, an α-olefin content of 10–60% by weight, a nonconjugated diene content of 0–12% by weight, and a Mooney viscosity ($ML_{1+4}$ 100° C.) of 10–100.

20. The automobile interior trim material according to claim 19, wherein the α-olefin is propylene or butene-1.

21. Moldings for automobile interior trim using the automobile interior trim material according to claim 4.

22. The automobile instrumental panel according to claim 5, wherein the olefin-based copolymer rubber (b) is an ethylene-α-olefin copolymer rubber or ethylene-α-olefin-nonconjugated diene terpolymer rubber having an ethylene content of 90–40% by weight, an α-olefin content of 10–60% by weight, a nonconjugated diene content of 0–12% by weight, and a Mooney viscosity ($ML_{1+4}$ 100° C.) of 10–100.

23. The automobile instrumental panel according to claim 22, wherein the α-olefin is propylene or butene-1.

* * * * *